US012658169B2

(12) United States Patent
Lo et al.

(10) Patent No.: US 12,658,169 B2
(45) Date of Patent: Jun. 16, 2026

(54) RECURSIVE TRAINING OF ADAPTIVE FILTERS FOR ACTIVE NOISE CONTROL (ANC) SYSTEMS

(71) Applicant: Synaptics Incorporated, San Jose, CA (US)

(72) Inventors: Yi-Yang Lo, Hsinchu County (TW); Yi-Rou Chen, Hsinchu County (TW); Saeed Mosayyebpour Kaskari, Irvine, CA (US); Hong Qiu, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 150 days.

(21) Appl. No.: 18/583,224

(22) Filed: Feb. 21, 2024

(65) Prior Publication Data

US 2025/0266028 A1 Aug. 21, 2025

(51) Int. Cl.
*G10K 11/178* (2006.01)

(52) U.S. Cl.
CPC .. *G10K 11/17815* (2018.01); *G10K 11/17881* (2018.01); *G10K 2210/1081* (2013.01); *G10K 2210/3026* (2013.01); *G10K 2210/3027* (2013.01); *G10K 2210/3028* (2013.01)

(58) Field of Classification Search
CPC .......................... H04R 1/1083; H04R 2460/01
See application file for complete search history.

(56) References Cited

U.S. PATENT DOCUMENTS 11,564,035 B1 * 1/2023 Ebenezer ......... G10K 11/17881
2010/0266134 A1 * 10/2010 Wertz ............... G10K 11/17879 381/71.1

OTHER PUBLICATIONS

Gustavsen et al., "Rational Approximation of Frequency Domain Responses by Vector Fitting," IEEE Trans. Power Delivery, vol. 14, No. 3, pp. 1052-1061, Jul. 1999.
Kuo et al., "Active Noise Control System for Headphone Applications," in IEEE Transactions on Control Systems Technology, vol. 14, No. 2, pp. 331-335, Mar. 2006, doi: 10.1109/TCST.2005.863667.
Kuo and Morgan, "Active Noise Control: A Tutorial Review," in Proceedings of the IEEE, vol. 87, No. 6, pp. 943-973, Jun. 1999.
(Continued)

*Primary Examiner* — Ping Lee
(74) *Attorney, Agent, or Firm* — Paradice & Li LLP

(57) ABSTRACT

This disclosure provides methods, devices, and systems for active noise control (ANC). The present implementations more specifically relate to filter adaptation techniques for recursively training an infinite impulse response (IIR) filter to convert a reference audio signal to an anti-noise signal. In some aspects, an ANC system may record, via a feedforward microphone, a reference audio signal representing external noise, and may further record, via a feedback microphone, an error signal representing residual noise resulting from passive attenuation of the external noise via a primary path between the microphones. The ANC system may further estimate an IIR filter that converts the reference audio signal to the error signal based on a secondary path. In some implementations, the ANC system may recursively update the IIR filter coefficients based, at least in part, on the coefficients associated with previous frames of the reference audio signal and the error signal.

18 Claims, 6 Drawing Sheets

(56) References Cited

OTHER PUBLICATIONS

Lopez-Gaudana et al., "A Hybrid Active Noise Cancelling with Secondary Path Modeling," 2008 51st Midwest Symposium on Circuits and Systems, Knoxville, TN, USA, 2008, pp. 277-280, doi: 10.1109/MWSCAS.2008.4616790.

Ma et al. "Efficient Method to Determine Diagonal Loading Value," 2003 IEEE International Conference on Acoustics, Speech, and Signal Processing, 2003. Proceedings. (ICASSP '03)., Hong Kong, China, 2003, pp. V-341 to V-344, doi: 10.1109/ICASSP.2003.1199948.

Parker, "Geophysical Inverse Theory," Princeton: Princeton University Press, 1994, pp. 1-10 (Frontmatter, Contents, Preface), https://www.degruyter.com/document/doi/10.1515/9780691206837/html?lang=en#contents.

Parks and Burrus, "Digital Filter Design," New York: John Wiley & Sons, 1987, pp. 226-228 (177 pages).

Stoer et al., Introduction to Numerical Analysis (3rd ed.), Springer, p. 225, 2002, ISBN 0-387-95452-X (672 pages).

Wiener, "Extrapolation, Interpolation, and Smoothing of Stationary Time Series," New York: Wiley, 1949, ISBN 0-262-73005-7 8 pages (Frontmatter, Preface, Contents).

Zeng et al., "Modified Rational Function Modeling Technique for High Speed Circuits," IEEE MTT-S Int. Microwave Symp. Dig., San Francisco, CA, Jun. 11-16, 2006, pp. 1951-1954.

* cited by examiner

RECURSIVE TRAINING OF ADAPTIVE FILTERS FOR ACTIVE NOISE CONTROL (ANC) SYSTEMS

TECHNICAL FIELD

The present implementations relate generally to acoustic noise suppression, and specifically to recursive training of adaptive filters for active noise control (ANC) systems.

BACKGROUND OF RELATED ART

Active noise control (ANC) systems suppress noise or unwanted sounds in an acoustic channel (such as a human ear) by producing "anti-noise" waveforms (also referred to as "anti-sound" waveforms) that cancel or attenuate the noise in the channel. More specifically, the anti-noise waveform is equal in amplitude and opposite in phase to the noise waveform so that the waveforms cancel each other based on the principles of superposition. ANC systems are often implemented in wearable devices that are designed to be worn in or over a user's ears (such as headsets, headphones, and earbuds, among other examples). Such wearable devices generally include a microphone to record or detect the unwanted noise, an adaptive filter to convert the recorded noise to an anti-noise signal, and a noise cancelling speaker to output the anti-noise signal as an acoustic waveform that cancels the noise in a user's ear.

In feedforward (FF) ANC systems, a reference microphone (also referred to as a "feedforward microphone") is disposed on an outer surface of an earpiece (such as an earcup or an earbud) to record external noise that may filter into a user's ear. Such external noise may be attenuated or altered by the physical properties of the earpiece (also referred to as an "acoustic response") before reaching the user's ear. The acoustic response of the earpiece can be modeled as a transfer function (P[z]) that converts the external noise to residual noise incident upon the user's ear. Existing FF ANC systems rely on estimates of the transfer function P[z] to calculate a finite impulse response (FIR) filter that can convert the recorded noise to an anti-noise signal.

FIR filters tend to require a significant amount of power, which may not be practical for many ANC applications (such as wireless headsets). By comparison, infinite impulse response (IIR) filters consume significantly less power and are thus much more efficient than FIR filters. As such, FIR filters are often converted (or mapped) to IIR filters for implementation in ANC systems. However, existing ANC systems can accumulate significant errors from the estimation of the transfer function P[z] and the mapping of the FIR filter to an IIR filter. Thus, new filter adaptation techniques are needed to improve the quality of noise suppression in ANC systems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of acoustic noise suppression performed by an active noise control (ANC) system. The method includes recording a reference audio signal via a first microphone associated with the ANC system; recording an error signal via a second microphone associated with the ANC system; determining a plurality of first coefficients for an infinite impulse response (IIR) filter based on, an initial IIR filter having a plurality of predetermined coefficients, a first frame of the reference audio signal, and a first frame of the error signal, where the IIR filter transforms the reference audio signal into an anti-noise signal that matches the error signal as a result of an acoustic response of the ANC system between the first microphone and the second microphone; and determining a plurality of second coefficients for the IIR filter based on the plurality of first coefficients, a second frame of the reference audio signal, and a second frame of the error signal.

Another innovative aspect of the subject matter of this disclosure can be implemented in a controller for an ANC system, including a processing system and a memory. The memory stores instructions that, when executed by the processing system, cause the controller to record a reference audio signal via a first microphone associated with the ANC system; record an error signal via a second microphone associated with the ANC system; determine a plurality of first coefficients for an IIR filter based on an initial IIR filter having a plurality of predetermined coefficients, a first frame of the reference audio signal, and a first frame of the error signal, where the IIR filter transforms the reference audio signal into an anti-noise signal that matches the error signal as a result of an acoustic response of the ANC system between the first microphone and the second microphone; and determine a plurality of second coefficients for the IIR filter based on the plurality of first coefficients, a second frame of the reference audio signal, and a second frame of the error signal.

BRIEF DESCRIPTION OF THE DRAWINGS

The present implementations are illustrated by way of example and are not intended to be limited by the figures of the accompanying drawings.

DETAILED DESCRIPTION

Figure 1:
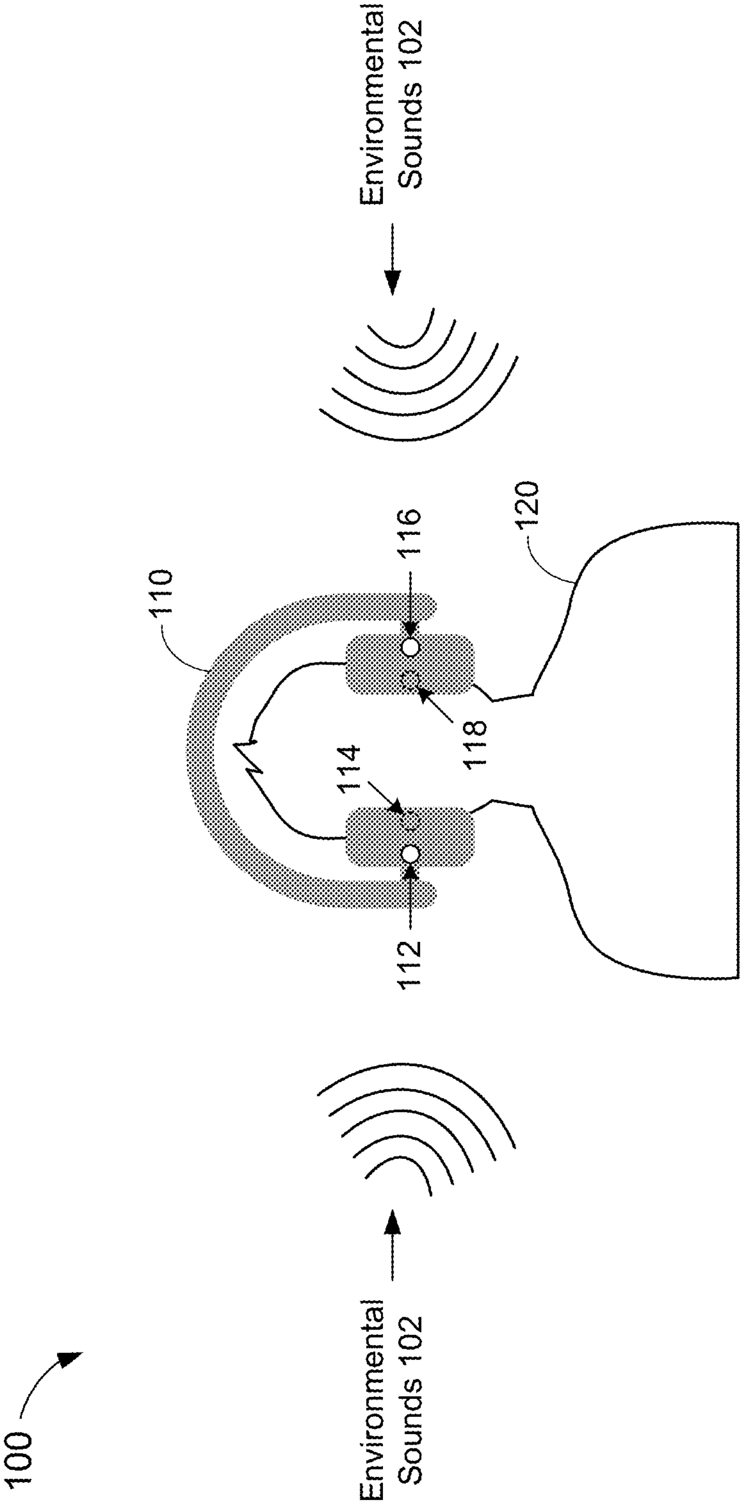
FIG. 1 shows an example environment for which acoustic noise suppression may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), nonvolatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, in feedforward (FF) active noise control (ANC) systems, a reference microphone (also referred to as a "feedforward microphone") is disposed on an outer surface of an earpiece (such as an earcup or an earbud) to record external noise that may filter into a user's ear. Such external noise may be attenuated or altered by the physical properties of the earpiece (also referred to as an "acoustic response") before reaching the user's ear. The acoustic response of the earpiece can be modeled as a transfer function (P[z]) that converts the external noise to residual noise incident upon the user's ear. Existing FF ANC systems rely on estimates of the transfer function P[z] to calculate a finite impulse response (FIR) filter that can convert the recorded noise to an anti-noise signal.

FIR filters tend to require a significant amount of power, which may not be practical for many ANC applications (such as wireless headsets). By comparison, infinite impulse response (IIR) filters consume significantly less power and are thus much more efficient than FIR filters. As such, FIR filters are often converted (or mapped) to IIR filters for implementation in ANC systems. However, existing ANC systems can accumulate significant errors from the estimation of the transfer function P[z] and the mapping of the FIR filter to an IIR filter. Aspects of the present disclosure recognize that such errors can be avoided by directly calculating the IIR filter, without estimating the transfer function P[z] or calculating an FIR filter.

Various aspects relate generally to ANC systems, and more particularly, to filter adaptation techniques for recursively training an IIR filter to convert a reference audio signal to an anti-noise signal. In some aspects, an ANC system may record, via an FF microphone, a reference audio signal (ref[n]) representing external noise, and may further record, via a feedback (FB) microphone, an error signal (err[n]) representing residual noise resulting from passive attenuation of the external noise, where n is a frame (or sampling) index in a discrete time domain. The passive attenuation represents an acoustic response (P[z]) of a primary path of the ANC system between the FF and FB microphones. The ANC system may further estimate an IIR filter $$\left(\frac{b[n]}{a[n]}\right)$$

that converts the reference audio signal ref[n] to the error signal err[n], where $$ref[n]*s[n]*\frac{b[n]}{a[n]}=err[n],$$

and where[*] denotes a convolution and s[n] represents an impulse response of a secondary path of the ANC system. In some implementations, the ANC system may recursively update the IIR filter coefficients a[n] and b[n] based, at least in part, on the coefficients a[n−1] associated with the previous frame of the reference audio signal ref[n−1] and error signal err[n−1] until a[n]≅a[n−1].

Particular implementations of the subject matter described in this disclosure can be implemented to realize one or more of the following potential advantages. As described above, existing ANC systems rely on estimates for the acoustic response P[z] of the primary path, and S[z] of the secondary path, of the ANC system to calculate an FIR filter that can be converted to an IIR filter, where S[z] is a transfer function of the secondary path in the z-domain. As a result, estimation errors associated with the acoustic response P[z], and transfer errors associated with the mapping from the FIR domain to the IIR domain, may accumulate in the IIR filter. By contrast, the IIR filter of the present implementations is trained only on the secondary path of the ANC system. By directly calculating an IIR filter based on the secondary path, aspects of the present disclosure can avoid estimation errors associated with the acoustic response P[z] as well as transfer errors associated with the mapping from the FIR domain to the IIR domain. As a result, the IIR filters of the present implementations may significantly improve the quality and performance of acoustic noise suppression compared to the IIR filters implemented by existing ANC systems.

FIG. 1 shows an example environment 100 for which acoustic noise suppression may be implemented. The environment 100 includes a wearable audio device 110 and a user 120. In the example of FIG. 1, the wearable audio device 110 is depicted as a headset having earcups designed to be worn over a user's ears. However, in some other implementations, the wearable audio device 110 may include a pair of earbuds that are designed to be worn inside a user's ear canals. As used herein, the term "earpiece" may generally refer to any portions of the wearable audio device 110 that at least partially covers a user's ears (such as an earcup or an earbud).

In some aspects, the wearable audio device 110 may include a number of microphones 112-118 disposed on the earpieces. As shown in FIG. 1, the left earpiece includes a first pair of microphones 112 and 114 and the right earpiece includes a second pair of microphones 116 and 118. More specifically, the microphones 114 and 118 are disposed on an inner surface of each earpiece in close proximity to the user's ears, whereas the microphones 112 and 116 are disposed on an outer surface of each earpiece further away from the user's ears. In the example of FIG. 1, the wearable audio device 110 is shown to include only four microphones 112-118. However, in actual implementations, the wearable audio device 110 may include more microphones than those depicted in FIG. 1.

The microphones 112 and 116 are positioned or otherwise configured to detect external sounds 102 in the surrounding environment 100 (depicted as a series of acoustic waves). Thus, the microphones 112 and 116 may be referred to herein as feedforward (FF) microphones (or "reference" microphones"). Each of the microphones 112 and 116 is configured to convert the detected external sounds 102 to an electrical signal representative of the acoustic waveform. Such electrical signals may be referred to herein as "reference audio signals."

The microphones 114 and 118 are positioned or otherwise configured to detect residual sounds from the surrounding environment 100 (not shown for simplicity) that filter through the earpieces and enter the user's ears. Thus, the microphones 114 and 118 may be referred to herein as feedback (FB) microphones (or "error microphones"). Each of the microphones 114 and 118 may convert the detected residual sounds to an electrical signal representative of the acoustic waveform. Such electrical signals may be referred to herein as "error signals."

For some applications, the environmental sounds 102 may be distracting to the user 120 or otherwise perceived as unwanted noise (such as when listening to audio playback via the wearable audio device 110). In some aspects, the wearable audio device 110 may suppress or attenuate the residual sounds that filter or pass through the earpieces. For example, the wearable audio device 110 may use the FF microphones 112 and 116 to detect the characteristics or waveform of the environmental sounds 102 and produce an anti-noise waveform that can cancel or attenuate the residual sounds at the user's ears. More specifically, the anti-noise waveform may be equal in amplitude and opposite in phase to the waveform of the residual sounds so that the waveforms cancel each other based on the principles of superposition (also referred to as "destructive interference").

Figure 2:
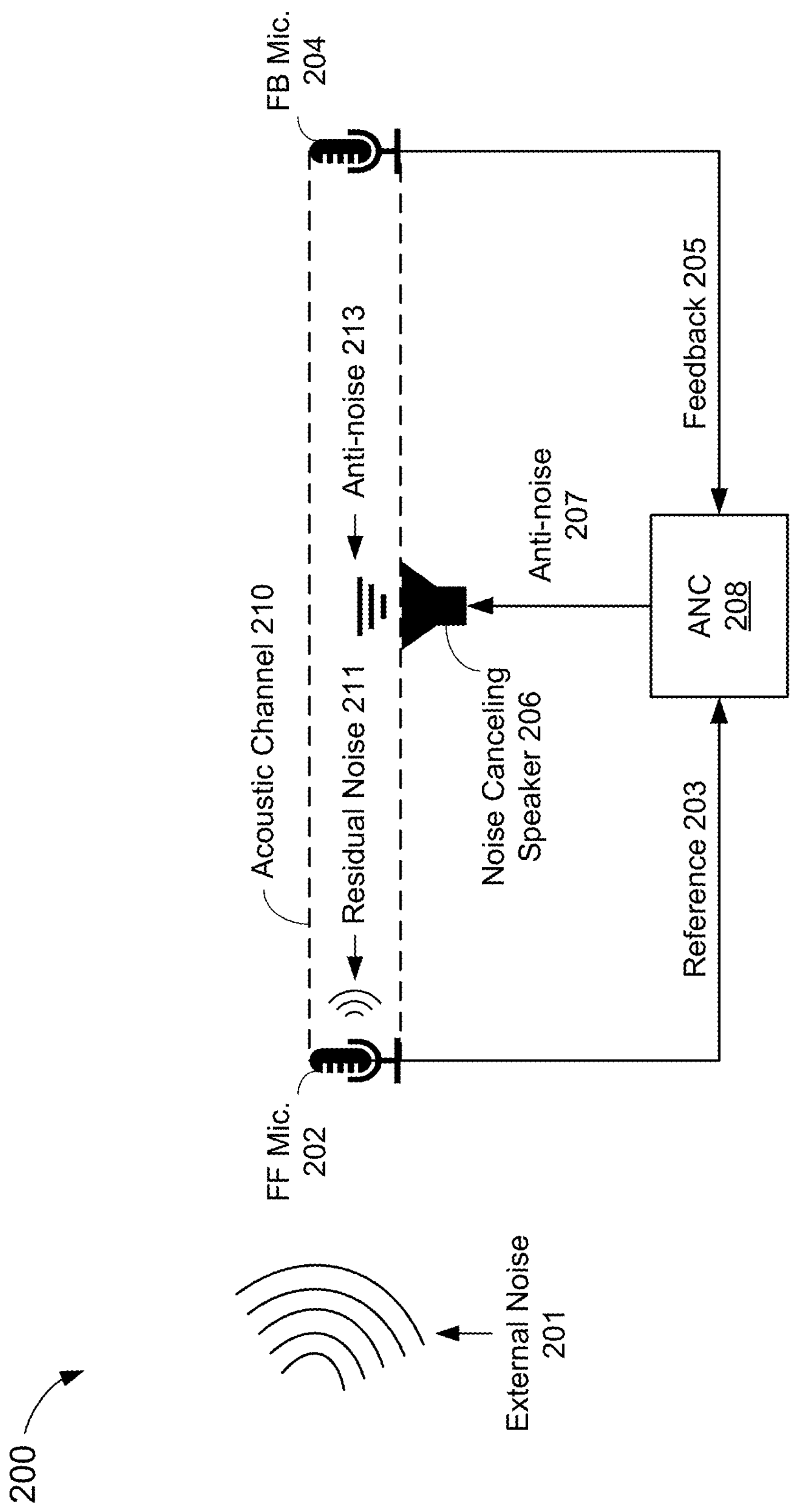
FIG. 2 shows an example active noise control (ANC) system.

FIG. 2 shows an example active noise control (ANC) system 200. The ANC system 200 includes an FF microphone 202, an FB microphone 204, a noise canceling speaker 206, and an ANC component 208. In some implementations, the ANC system 200 may be one example of the wearable audio device 110 of FIG. 1. With reference to FIG. 1, the FF microphone 202 and FB microphone 204 may be examples of the microphones 112 and 114, respectively, of the left earpiece or the microphones 116 and 118, respectively, of the right earpiece. More specifically, the FB microphone 204 may be disposed on an inner surface of an earpiece or housing that is in close proximity to a user's ear when the earpiece is worn by the user, and the FF microphone 202 may be disposed on an outer surface of the earpiece or housing that is further away from the user's ear when the earpiece is worn by the user.

The FF microphone 202 is configured to convert acoustic waves representing external noise 201 from the surrounding environment (such as the environmental sound 102 of FIG. 1) to a reference audio signal 203. As described with reference to FIG. 1, at least some of the external noise 201 filters through the earpiece as residual noise 211. In other words, the residual noise 211 is a result of the external noise 201 being attenuated or altered by the physical properties of the earpiece (also referred to as "passive attenuation"). In some implementations, the ANC component 208 may convert the reference audio signal 203 to an anti-noise signal 207 for output, by the noise cancelling speaker 206, as an acoustic "anti-noise" waveform 213. More specifically, the ANC component 208 models responses associated with the passive attenuation, loudspeaker response, air inside a channel (or tub), and various other factors that may affect the anti-noise waveform 213 or the residual noise 211, so that the anti-noise waveform 213 has substantially the same amplitude but opposite phase as the waveform of the residual noise 211.

The residual noise 211 combines with the anti-noise 213 in an acoustic channel 210 that guides or directs sounds towards the user's ear (such as an acoustic duct or cavity of the earpiece). As a result, the anti-noise 213 cancels or attenuates the amount of residual noise 211 that reaches the user's ear. The amount of noise suppression or attenuation depends on how closely the anti-noise waveform 213 matches the waveform of the residual noise 211, and thus, the accuracy with which the ANC component 208 models the acoustic response of the earpiece or the ANC system 200. The FB microphone 204 is configured to detect any sounds that enter the user's ear and convert such acoustic waves to a feedback signal 205. Thus, the feedback signal 205 may indicate how much of the residual noise 211 is attenuated by the anti-noise 213. In some implementations, the ANC component 208 may use the feedback signal 205 to dynamically improve the accuracy of the anti-noise signal 207.

Figure 3:
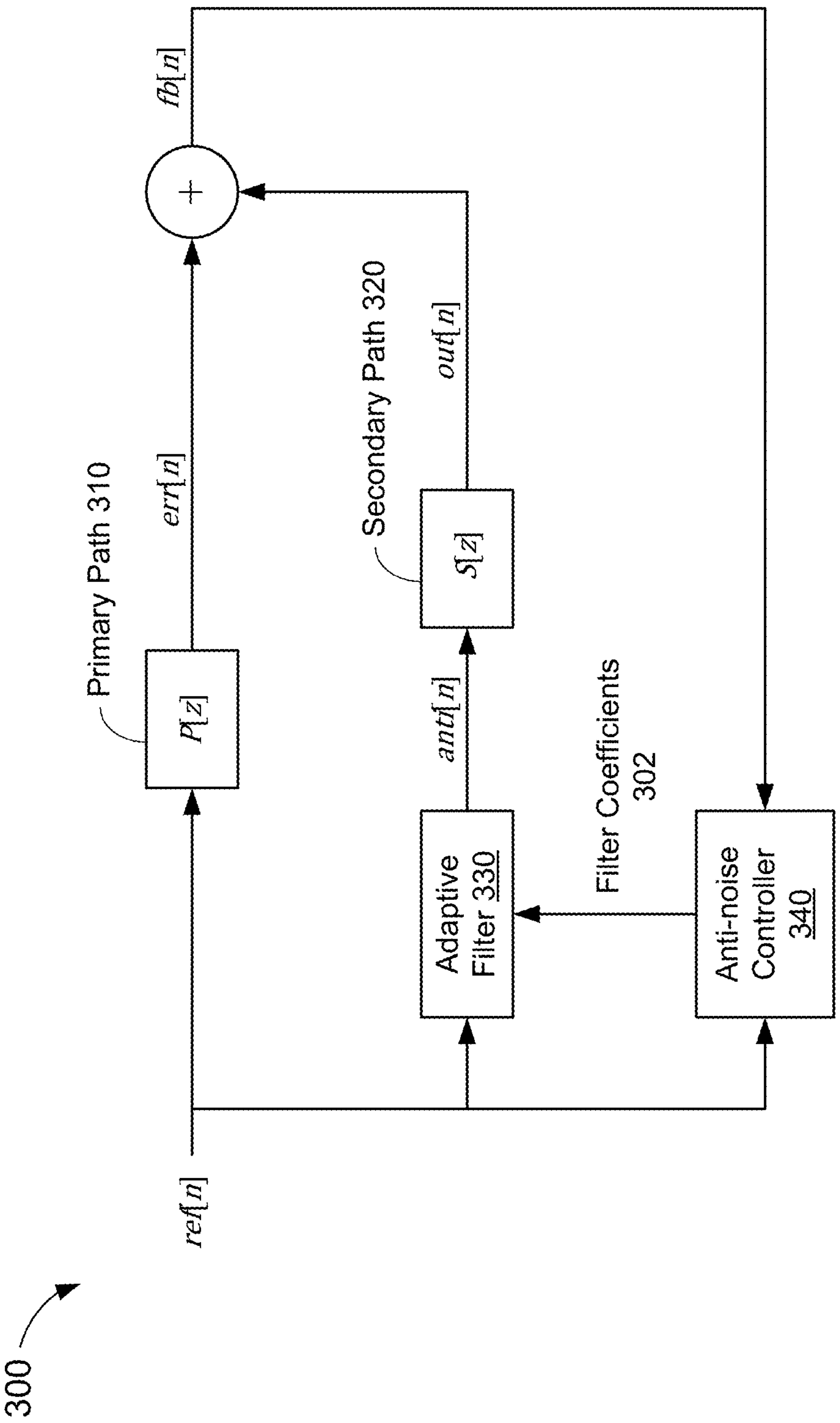
FIG. 3 shows a simplified block diagram of an example ANC system, according to some implementations.

FIG. 3 shows a simplified block diagram of an example ANC system 300, according to some implementations. In some implementations, the ANC system 300 may be one example of the ANC system 200 of FIG. 2. More specifically, the ANC system 300 is configured to produce an anti-noise signal (anti[n]) based on a reference audio signal (ref[n]), where n is a frame (or sampling) index in a discrete time domain. With reference to FIG. 2, the reference audio signal ref[n] may be one example of the reference audio signal 203 and the anti-noise signal anti[n] may be one example of the anti-noise signal 207.

The ANC system 300 includes a primary acoustic path 310, an adaptive filter 330, a secondary acoustic path 320, and an anti-noise controller 340. The primary path 310 represents an acoustic response of the ANC system 300 that transforms the reference audio signal ref[n] into an error signal (err[n]). With reference for example to FIG. 2, the error signal err[n] may represent the residual noise 211 that enters the acoustic channel 210. Thus, the primary path 310 describes the passive attenuation of the earpiece between the microphones 202 and 204. The primary path 310 can be modeled as a transfer function P[z], in the z-domain, using ref[n] as the input and err[n] as the output, where ref[n]+p[n]=err[n] and p[n] is the impulse response of the primary path.

The adaptive filter 330 converts the reference audio signal ref[n] to the anti-noise signal anti[n]. The secondary path 320 transforms the anti-noise signal anti[n] into an output signal (out[n]) that can be used to cancel or suppress the error signal err[n]. With reference for example to FIG. 2, the output signal out[n] may represent the anti-noise waveform 213 that is output to the acoustic channel 210 via the noise canceling speaker 206. Thus, the secondary path 320 may include a digital-to-analog converter (DAC), reconstruction filter, power amplifier (PA), loudspeaker, FB microphone, acoustic medium (such as air) between the loudspeaker and the FB microphone, preamplifier, antialiasing filter, and analog-to-digital converter (ADC). The secondary path 320 can be modeled as a transfer function S[z], where the output signal out[n] is produced as a result of the anti-noise signal anti[n] passing through S[z].

The anti-noise controller 340 determines a set of coefficients (or weights) 302 for the adaptive filter 330 that causes the output signal out[n] to match the error signal err[n]. More specifically, the filter coefficients 302 may cause the adaptive filter 330 to convert the reference audio signal ref[n] to an anti-noise signal anti[n] that transforms into an output signal out[n], via the secondary path 320, having substantially the same amplitude and opposite phase as the error signal err[n]. With proper tuning of the filter coefficients 302, the output signal out[n] may cancel or attenuate the error signal err[n] at the user's ear. The result of the attenuation is detected by an FB microphone (such as the FB microphone 204 of FIG. 2) as a feedback signal (fb[n]) that can be used by the anti-noise controller 340 to fine-tune or update the filter coefficients 302.

When the output signal out[n] is perfectly matched to the error signal err[n], the feedback signal fb[n] is nullified or otherwise approaches zero. Thus, the performance of the ANC system 300 depends on the accuracy of the anti-noise signal anti[n] produced by the adaptive filter 330. In existing ANC systems, the adaptive filter 330 is initially modeled as a finite impulse response (FIR) filter W[z] based on the transfer functions P[z] and S[z], where:

$$W[z] = \frac{P[z]}{S[z]} \tag{1}$$

With reference to Equation 1, the transfer function S[z] can be determined relatively accurately based on known properties or characteristics of various circuit components and media associated with the secondary path 320 (such as a DAC, reconstruction filter, PA, loudspeaker, FB microphone, air, preamplifier, antialiasing filter, and ADC). Many existing ANC systems estimate the primary path transfer function P[z] associated with the primary path 310 based on the reference audio signal ref[n] and the error signal err[n], where:

$$ref[n] * p[n] = err[n] \tag{2}$$

FIR filters tend to require a significant amount of power, which may not be practical for many ANC applications (such as wireless headsets). Thus, the FIR filter W[z] is often mapped to an IIR filter for use as the adaptive filter 330. However, the IIR filters used in existing ANC systems can accumulate significant errors from the estimation of the transfer function P[z] and the mapping from the FIR domain to the IIR domain.

In some aspects, the ANC controller 340 may avoid any errors associated with estimating the transfer function P[z], or mapping between the FIR and IIR domains, by directly calculating an IIR filter $$\left(\frac{b[n]}{a[n]}\right)$$

to be used as the adaptive filter 330 based on the reference audio signal ref[n] and the error signal err[n], where:

$$ref[n] * \frac{b[n]}{a[n]} * s[n] = err[n] \tag{3}$$

With reference to Equation 3, the reference audio signal ref[n] can be recorded via an FF microphone (such as the FF microphone 202 of FIG. 2) and the error signal err[n] can be recorded via an FB microphone (such as the FB microphone 204 of FIG. 2) when no output signal out[n] is provided to the same acoustic channel. The secondary path transfer function S[z] can be calculated with a relatively high degree of accuracy based on known properties or characteristics of various circuit components and media associated with the secondary path 320. Accordingly, the ANC controller 340 can be trained to determine the IIR filter $$\frac{b[n]}{a[n]}$$

based on known parameters of Equation 3.

Figure 4:
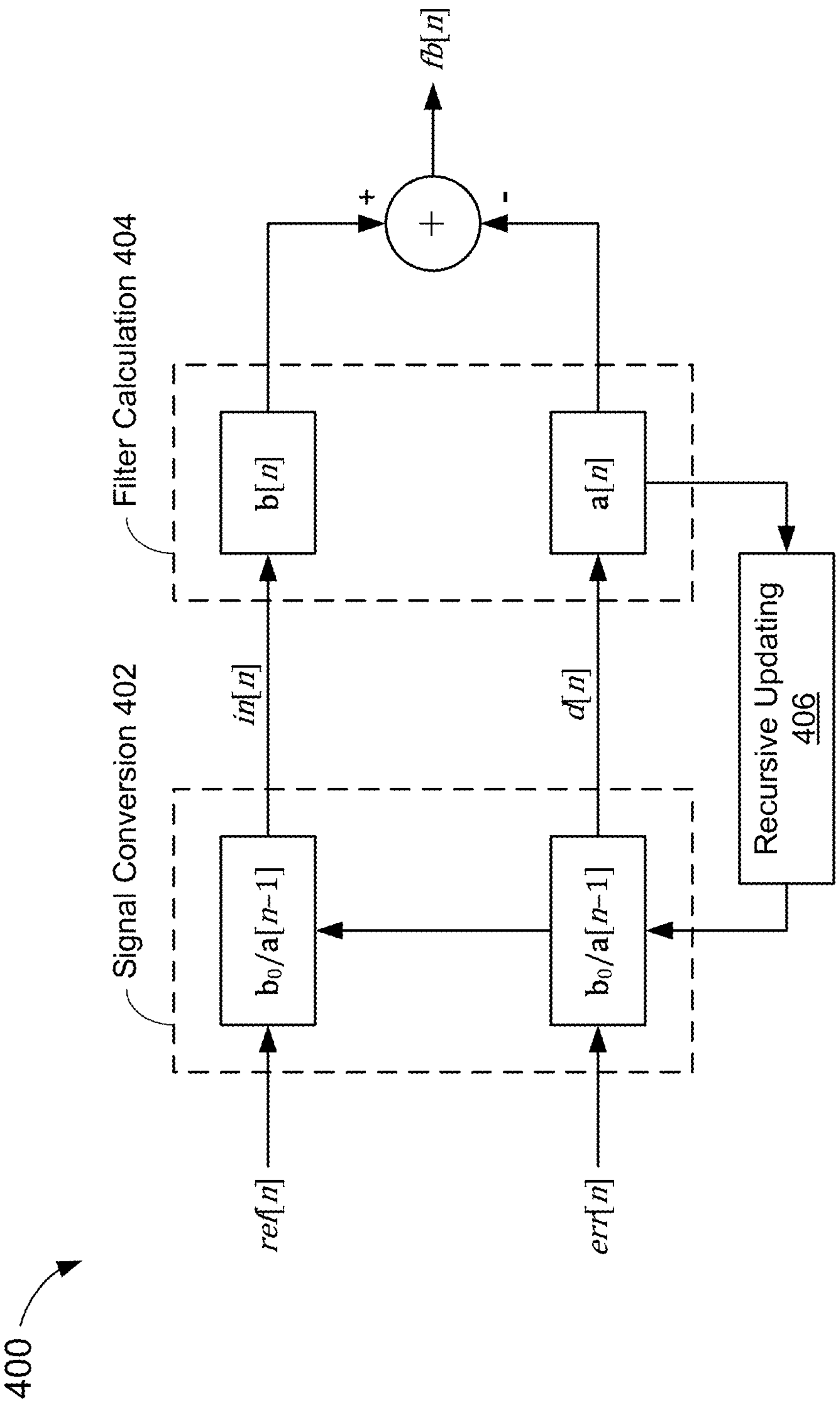
FIG. 4 shows a block diagram of an example anti-noise controller, according to some implementations.

FIG. 4 shows a block diagram of an example anti-noise controller 400, according to some implementations. In some implementations, the anti-noise controller 400 may be one example of the anti-noise controller 340 of FIG. 3. With reference to Equation 3, the anti-noise controller 400 may be trained to determine the coefficients a[n] and b[n] for the IIR filter based on a reference audio signal ref[n] and an error signal err[n]. In some implementations, the reference audio signal ref[n] may be recorded via an FF microphone associated with an ANC system (such as the FF microphone 202 of FIG. 2) and the error signal err[n] may be recorded via an FB microphone associated with the ANC system (such as the FB microphone 204 of FIG. 2). Thus, the IIR filter $$\frac{b[n]}{a[n]}$$

also may be referred to as "ANC filter."

The anti-noise controller 400 includes a signal conversion component 402, a filter calculation component 404, and a recursive updating component 406. The signal conversion component 402 is configured to convert the reference audio signal ref[n] and the error signal err[n] to an input signal in [n] and a desired signal d[n], respectively, based on a recursive IIR filter $$\left(\frac{b_0}{a[n-1]}\right),$$

where:

$$ref[n]*\frac{b_0}{a[n-1]}=\text{in}[n] \tag{4}$$

and refrain $$err[n]*\frac{b_0}{a[n-1]}=d[n] \tag{5}$$

The numerator of the recursive IIR filter includes a set of predetermined filter coefficients $b_0$ associated with a range of frequencies to be attenuated by the ANC system. For example, the filter coefficients $b_0$ may be configured to filter out unwanted frequencies of the reference audio signal ref[n] and the error signal err[n]. In some implementations, the filter coefficients $b_0$ may be configured as a low-pass filter. In some other implementations, the filter coefficients $b_0$ may be configured as a bandpass filter. Still further, in some implementations, the filter coefficients $b_0$ may be configured as a high-pass filter.

The denominator of the recursive IIR filter includes a set of filter coefficients a[n−1] derived from a previous frame of the reference audio signal ref[n−1] and a previous frame of the error signal err[n−1], for n≥0, where:

$$ref[n-1]=\left[ref\left[\text{overlap}-\frac{N}{2}\right],\ ref\left[\text{overlap}-\frac{N}{2}+1\right],\ \ldots,\ ref\left[\text{overlap}+\frac{N}{2}-1\right]\right]$$

$$err[n-1]=\left[err\left[\text{overlap}-\frac{N}{2}\right],\ err\left[\text{overlap}-\frac{N}{2}+1\right],\ \ldots,\ err\left[\text{overlap}+\frac{N}{2}-1\right]\right]$$

where $$\text{overlap}=n*\frac{N}{2}$$

(representing a 50% signal overlap) and N is an even numbered frame length.

In some implementations, the denominator of the recursive IIR filter may be initialized to a set of predetermined filter coefficients a, when calculating the ANC filter based on the first recorded frame of the reference audio signal ref[0] and the first recorded frame of the error signal err[0] (such that a[n−1]=$a_0$ for n=0).

The filter calculation component 404 determines a set of filter coefficients a[n] and b[n] for the ANC filter based on the following equation:

$$\text{in}[n]*b[n]=d[n]*a[n] \tag{6}$$

By combining Equations 4-6, the input signal in [n] and the desired signal d[n] can be calculated as follows:

$$\begin{cases}\text{in}[n]=\sum_{k=0}^{N}b_k ref[n-k]-\sum_{k=1}^{N}a_k\text{in}[n-k]\\ d[n]=\sum_{k=0}^{N}b_k err[n-k]-\sum_{k=1}^{N}a_k d[n-k]\end{cases} \tag{7}$$

where $b_0$=[$b_0$[0], $b_1$[0], . . . , $b_N$[0]] and $a_0$ [n−1]=[1, $a_1$ [n−1], . . . , $a_N$ [n−1]].

Based on Equation 7, the frame base of in [n] and d[n] can be composed as follows:

$$\text{in}[n]=[\text{in}[\text{overlap}],\ \text{in}[\text{overlap}+1],\ \ldots,\ \text{in}[\text{overlap}+N-1]]$$

$$d[n]=[d[\text{overlap}],\ d[\text{overlap}+1],\ \ldots,\ d[\text{overlap}+N-1]]$$

Based on the first frame of the reference audio signal ref[n] and the error signal err[n], Equation 7 can further be rewritten in matrix form:

$$A[n]=\begin{bmatrix} \text{in}[0] & 0 & 0 & 0 & \ldots & 0 & 0 & \ldots & 0 \\ \text{in}[1] & \text{in}[0] & 0 & 0 & \ldots & d[0] & 0 & \ldots & 0 \\ \text{in}[2] & \text{in}[1] & 0 & 0 & 0 & d[1] & d[0] & \ldots & 0 \\ \vdots & \vdots & 0 & \vdots & \vdots & \vdots & \vdots & \vdots & \vdots \\ \text{in}[N-1] & \text{in}[N-2] & \ldots & \text{in}[N-L+1] & \text{in}[N-L] & d[N-2] & d[N-3] & \ldots & d[N-L+1] \end{bmatrix}$$

$$x[n]=\begin{bmatrix} b[0] \\ b[1] \\ \vdots \\ b[L-1] \\ a[1] \\ a[2] \\ \vdots \\ a[L-1] \end{bmatrix}$$

$$y[n]=\begin{bmatrix} d[0] \\ d[1] \\ \vdots \\ d[N] \end{bmatrix}$$

In some implementations, the filter calculation component 404 may calculate the filter coefficients a[n] and b[n] associated with the current frame n using Wiener-Hopf equations:

$$R_{AA}x=R_{Ay} \tag{8}$$

where $R_{AA}=A[n]^H A[n]$ and $R_{Ay}=A[n]^H y[n]$. For example, after solving for the unknown vector $$x=R_{AA}^{-1}R_{Ay},$$

the coefficients a and b can be extracted from the vector x, where:

$$b=[b[0]\ \ldots\ b[L]]$$

$$a=[1\quad a1]$$

and where a1=[a[1] a[2] . . . a[L−1]].

In some implementations, the filter calculation component 404 may use diagonal loading techniques to improve the robustness of the calculations associated with Equation 8, where:

$$AI=A+\beta I$$

where β is a constant having a value less than 1 and I is the identity matrix. Then the vector x can be rewritten as:

$$x=(AI^H AI)^{-1}AI^H y$$

In some implementations, the filter calculation component 404 may use QR decomposition techniques to further improve the robustness of the calculations associated with Equation 8, where:

$$QR=AI$$

Assuming the matrix A (or AI) can be subdivided into two parts according to the filter coefficients b and a, the contribution from the vector a1 in the matrix AI can be expressed as:

$$Q(:,L+1:2L-1)R(L+1:2L-1,L+1:2L-1)$$

where Q (:, L+1:2L−1) extracts all column elements, and row elements from length L+1 to 2L−1, of the Q matrix, and R (L+1:2L−1, L+1:2L−1) extracts column and row elements from length L+1 to 2L−1 of the R matrix. As such, the vector a1 can be calculated according to the following equation:

$$a1=R(L+1:2L-1,L+1:2L-1)^{-1}Q(:,L+1:2L-1)^T y$$

To calculate the filter coefficients b, the matrix A (or AI) may be reshaped so that:

$$AIr=[AI(:,L+1:2L-1),AI(:,1:L)]$$

where AI (:, L+1:2L−1) extracts all column elements, and row elements from length L+1 to 2L−1, of the AI matrix, and AI (:, 1:L) extracts all column elements, and row elements from length 1 to L, of the AI matrix. As such, the QR decomposition can be expressed as:

$$Q_r R_r=AIr$$

and the filter coefficients b can be calculated according to the following equation:

$$b = R_r(L+1:2L-1, L+1:2L-1)^{-1} Q_r(:, L+1:2L-1)^T y$$

The recursive updating component 406 is configured to compare the filter coefficients a[n] calculated for the current frame n with the filter coefficients a[n−1] calculated for the previous frame n−1 to determine whether to update the coefficients a and b of the ANC filter. For example, the recursive updating component 406 may update the filter coefficients a and b by providing the filter coefficients a[n] for the current frame n back to the signal conversion component 402, to be used in the recursive IIR filter (as a[n−1]) applied to the next frame of audio. In some implementations, the recursive updating component 406 may continuously update the filter coefficients a and b until the filter coefficients a[n] converge or otherwise remain relatively unchanged across multiple updates (such as where a[n]≅a[n−1]). For example, the recursive updating component 406 may calculate a distance D between the filter coefficients a[n] and a[n−1] and compare the distance D with a threshold (T). More specifically, the recursive updating component 406 may determine that the filter coefficients a[n] have converged when D≤T.

Upon determining that the filter coefficients a[n] have converged, the recursive updating component 406 may refrain from further updating the filter coefficients a and b of the ANC filter. At this time, the anti-noise controller 400 may use the ANC filter to actively cancel or attenuate the error signal err[n]. With reference for example to FIG. 3, the anti-noise controller 400 may tune the adaptive filter 330 using the filter coefficients a and b. As a result, the adaptive filter 330 converts the reference signal ref[n] to an anti-noise signal anti[n] based on the filter coefficients a and b. The secondary path 320 transforms the anti-noise signal anti[n] into an output signal out[n] that can be combined with the error signal err[n] to achieve the desired noise suppression or attenuation (such as described with reference to FIGS. 2 and 3).

Figure 5:
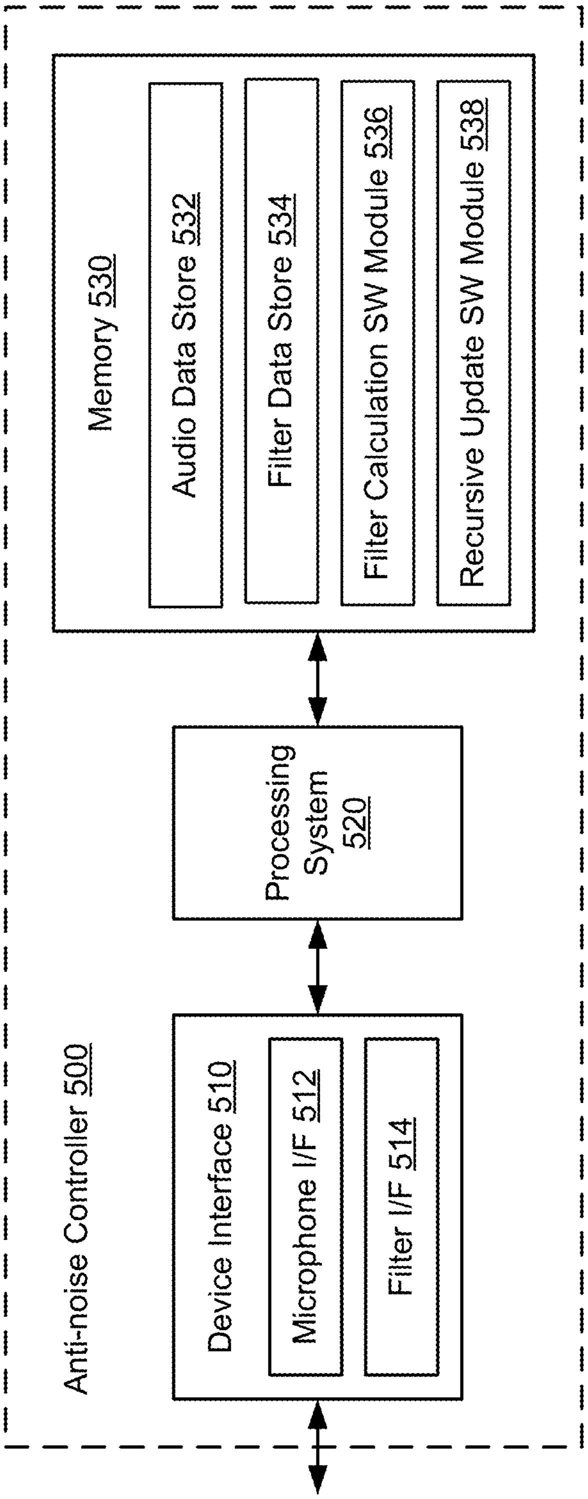
FIG. 5 shows another block diagram of an example anti-noise controller, according to some implementations.

FIG. 5 shows another block diagram of an example anti-noise controller 500, according to some implementations. In some implementations, the anti-noise controller 500 may be one example of the ANC component 208 of FIG. 2 or any of the anti-noise controllers 340 or 400 of FIGS. 3 and 4, respectively.

The anti-noise controller 500 includes a device interface 510, a processing system 520, and a memory 530. The device interface 510 is configured to communicate with one or more components of an ANC system (such as the wearable audio device 110 of FIG. 1 or any of the ANC systems 200 or 300 of FIGS. 2 and 3, respectively). More specifically, the device interface 510 may include a microphone interface (I/F) 512 and a filter interface (I/F) 514. The microphone interface 512 is configured to communicate with one or more microphones of the ANC system (such as the FF microphone 202 and the FB microphone 204 of FIG. 2). In some implementations, the microphone interface 512 may record a reference audio signal via a first microphone associated with the ANC system and also may record an error signal via a second microphone associated with the ANC system. The filter interface 514 is configured to communicate with an adaptive filter of the ANC system (such as the adaptive filter 330 of FIG. 3).

The memory 530 may include an audio data store 532 and a filter data store 534. The audio data store 532 is configured to store frames of the reference audio signal and the error signal as well as any intermediate signals that may be produced by the anti-noise controller 500 as a result of performing active noise control. The filter data store 534 is configured to store filter weights or coefficients for the adaptive filter of the ANC system. The memory 530 also may include a non-transitory computer-readable medium (including one or more nonvolatile memory elements, such as EPROM, EEPROM, Flash memory, or a hard drive, among other examples) that may store at least the following software (SW) modules:

- a filter calculation SW module 536 to determine a plurality of first coefficients for an IIR filter based on an initial IIR filter having a plurality of predetermined coefficients, a first frame of the reference audio signal, and a first frame of the error signal, where the IIR filter transforms the reference audio signal into an anti-noise signal that matches the error signal as a result of an acoustic response of the ANC system between the first microphone and the second microphone; and
- a recursive update SW module 538 to determine a plurality of second coefficients for the IIR filter based on the plurality of first coefficients, a second frame of the reference audio signal, and a second frame of the error signal.

Each software module includes instructions that, when executed by the processing system 520, causes the anti-noise controller 500 to perform the corresponding functions.

The processing system 520 may include any suitable one or more processors capable of executing scripts or instructions of one or more software programs stored in the anti-noise controller 500 (such as in the memory 530). For example, the processing system 520 may execute the filter calculation SW module 536 to determine a plurality of first coefficients for an IIR filter based on an initial IIR filter having a plurality of predetermined coefficients, a first frame of the reference audio signal, and a first frame of the error signal, where the IIR filter transforms the reference audio signal into an anti-noise signal that matches the error signal as a result of an acoustic response of the ANC system between the first microphone and the second microphone. The processing system 520 also may execute the recursive update SW module 538 to determine a plurality of second coefficients for the IIR filter based on the plurality of first coefficients, a second frame of the reference audio signal, and a second frame of the error signal.

Figure 6:
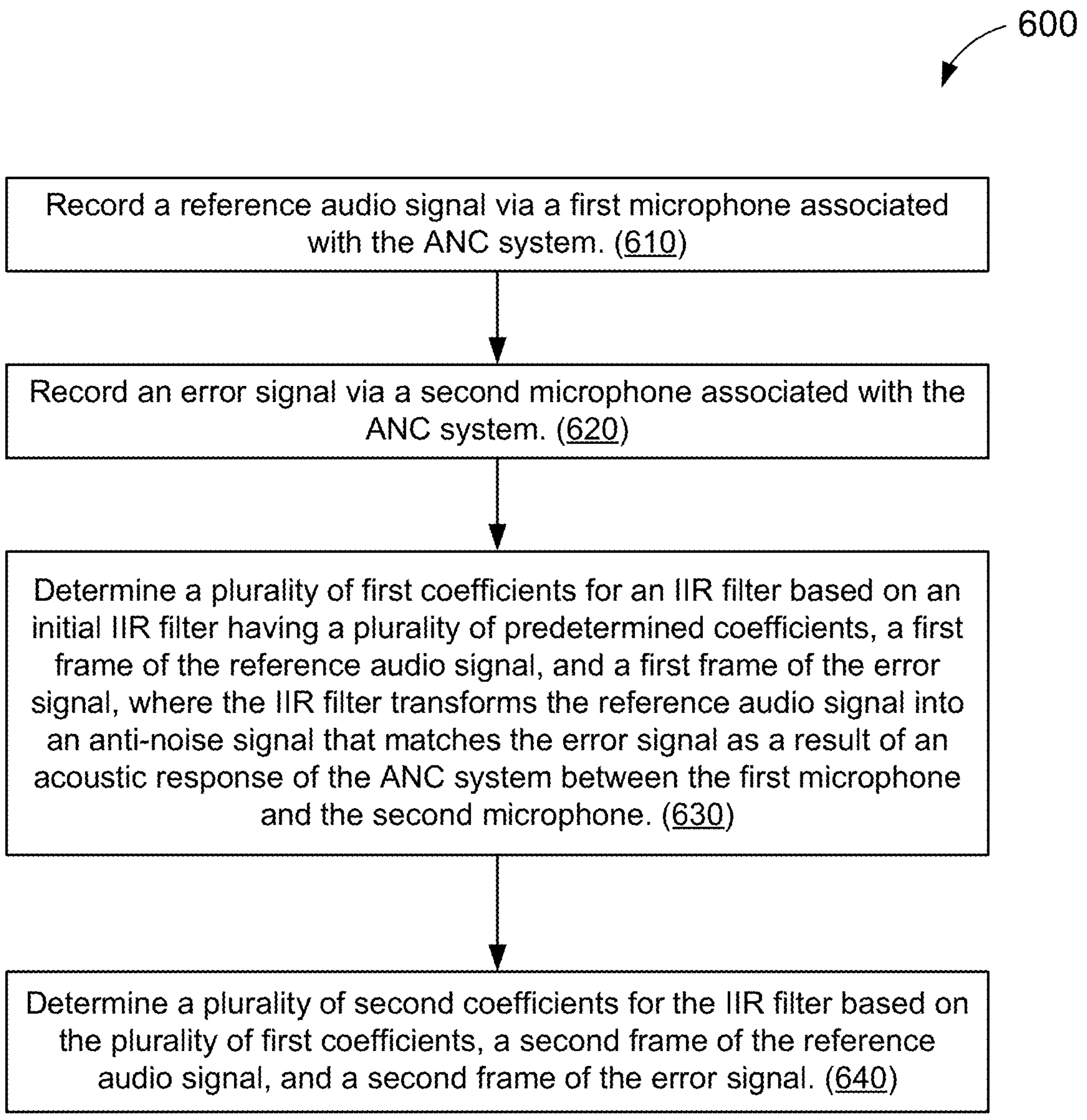
FIG. 6 shows an illustrative flowchart depicting an example operation for acoustic noise suppression, according to some implementations.

FIG. 6 shows an illustrative flowchart depicting an example operation 600 for acoustic noise suppression, according to some implementations. In some implementations, the example operation 600 may be performed by an ANC system such as the wearable audio device 110 of FIG. 1, any of the ANC systems 200 or 300 of FIGS. 2 and 3, respectively, or any of the anti-noise controllers 400 or 500 of FIGS. 4 and 5, respectively.

The ANC system records a reference audio signal via a first microphone associated with the ANC system (610). The ANC system records an error signal via a second microphone associated with the ANC system (620). In some implementations, the first microphone may be disposed on an outer surface of an earpiece, and the second microphone may be disposed on an inner surface of the earpiece that is closer than the outer surface to an ear of a user when the earpiece is worn by the user.

The ANC system determines a plurality of first coefficients for an IIR filter based on an initial IIR filter having a plurality of predetermined coefficients, a first frame of the reference audio signal, and a first frame of the error signal, where the IIR filter transforms the reference audio signal into an anti-noise signal that matches the error signal as a result of an acoustic response of the ANC system between the first microphone and the second microphone (630). In some implementations, the determining of the plurality of first coefficients may include converting the first frame of the reference audio signal to an input signal based on the initial IIR filter having a plurality of predetermined coefficients; converting the first frame of the error signal to a desired signal based on the initial IIR filter; and determining a first IIR filter that transforms the input signal into the desired signal, where the first IIR filter includes the plurality of first coefficients.

The ANC system further determines a plurality of second coefficients for the IIR filter based on the plurality of first coefficients, a second frame of the reference audio signal, and a second frame of the error signal (640). In some implementations, the second frame of the reference audio signal and the second frame of the error signal may follow the first frame of the reference audio signal and the first frame of the error signal, respectively, in time. In some implementations, the determining of the plurality of second coefficients may include converting the second frame of the reference audio signal to an input signal based on a first IIR filter having a numerator associated with a predetermined frequency bandwidth and a denominator associated with the plurality of first coefficients; converting the second frame of the error signal to a desired signal based on the first IIR filter; and determining a second IIR filter that transforms the input signal into the desired signal, the second IIR filter including the plurality of second coefficients.

In some aspects, the ANC system may further determine a distance between the plurality of first coefficients and the plurality of second coefficients and selectively update the IIR filter based on the distance between the plurality of first coefficients and the plurality of second coefficients. In some implementations, the selective updating of the IIR filter may include determining that the distance between the plurality of first coefficients and the plurality of second coefficients is greater than a threshold distance and updating the IIR filter responsive to determining that the distance between the plurality of first coefficients and the plurality of second coefficients is greater than the threshold distance. In some implementations, the updating of the IIR filter may include determining a plurality of third coefficients for the IIR filter based on the plurality of second coefficients, a third frame of the reference audio signal, and a third frame of the error signal.

In some other implementations, the selective updating of the IIR filter may include determining that the distance between the plurality of first coefficients and the plurality of second coefficients is less than a threshold distance and refraining from updating the IIR filter responsive to determining that the distance between the plurality of first coefficients and the plurality of second coefficients is less than the threshold distance. In some aspects, the ANC system may further output the anti-noise signal via one or more speakers associated with the ANC system based on determining that the distance between the plurality of first coefficients and the plurality of second coefficients is less than the threshold distance.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of acoustic noise suppression performed by an active noise control (ANC) system, comprising:

recording a reference audio signal via a first microphone associated with the ANC system;

recording an error signal via a second microphone associated with the ANC system;

determining a plurality of first coefficients for an infinite impulse response (IIR) filter based on an initial IIR filter having a plurality of predetermined coefficients, a first frame of the reference audio signal including a plurality of samples, and a first frame of the error signal, the IIR filter transforming the reference audio signal into an anti-noise signal that matches the error signal as a result of an acoustic response of the ANC system between the first microphone and the second microphone;

determining a plurality of second coefficients for the IIR filter based on the plurality of first coefficients, a second frame of the reference audio signal, and a second frame of the error signal;

determining a distance between the plurality of first coefficients and the plurality of second coefficients; and selectively updating the IIR filter based on the distance between the plurality of first coefficients and the plurality of second coefficients.

2. The method of claim 1, wherein the first microphone is disposed on an outer surface of an earpiece, and the second microphone is disposed on an inner surface of the earpiece that is closer than the outer surface to an ear of a user when the earpiece is worn by the user.

3. The method of claim 1, wherein the second frame of the reference audio signal and the second frame of the error signal follow the first frame of the reference audio signal and the first frame of the error signal, respectively, in time.

4. The method of claim 1, wherein the determining of the plurality of first coefficients comprises:

converting the first frame of the reference audio signal to an input signal based on the initial IIR filter;

converting the first frame of the error signal to a desired signal based on the initial IIR filter; and determining a first IIR filter for transforming the input signal into the desired signal, the first IIR filter including the plurality of first coefficients.

5. The method of claim 1, wherein the determining of the plurality of second coefficients comprises:

converting the second frame of the reference audio signal to an input signal based on a first IIR filter having a numerator associated with a predetermined frequency bandwidth and a denominator associated with the plurality of first coefficients;

converting the second frame of the error signal to a desired signal based on the first IIR filter; and determining a second IIR filter for transforming the input signal into the desired signal, the second IIR filter including the plurality of second coefficients.

6. The method of claim 1, wherein the selective updating of the IIR filter comprises:

determining that the distance between the plurality of first coefficients and the plurality of second coefficients is greater than a threshold distance; and updating the IIR filter responsive to determining that the distance between the plurality of first coefficients and the plurality of second coefficients is greater than the threshold distance.

7. The method of claim 6, wherein the updating of the IIR filter comprises:

determining a plurality of third coefficients for the IIR filter based on the plurality of second coefficients, a third frame of the reference audio signal, and a third frame of the error signal.

8. The method of claim 1, wherein the selective updating of the IIR filter comprises:

determining that the distance between the plurality of first coefficients and the plurality of second coefficients is less than a threshold distance; and refraining from updating the IIR filter responsive to determining that the distance between the plurality of first coefficients and the plurality of second coefficients is less than the threshold distance.

9. The method of claim 8, further comprising:

outputting the anti-noise signal via one or more speakers associated with the ANC system based on determining that the distance between the plurality of first coefficients and the plurality of second coefficients is less than the threshold distance.

10. A controller for an active noise control (ANC) system comprising:

a processing system; and a memory storing instructions that, when executed by the processing system, causes the controller to:

record a reference audio signal via a first microphone associated with the ANC system;

record an error signal via a second microphone associated with the ANC system;

determine a plurality of first coefficients for an infinite impulse response (IIR) filter based on an initial IIR filter having a plurality of predetermined coefficients, a first frame of the reference audio signal including a plurality of samples, and a first frame of the error signal, the IIR filter transforming the reference audio signal into an anti-noise signal that matches the error signal as a result of an acoustic response of the ANC system between the first microphone and the second microphone;

determine a plurality of second coefficients for the IIR filter based on the plurality of first coefficients, a second frame of the reference audio signal, and a second frame of the error signal;

determining a distance between the plurality of first coefficients and the plurality of second coefficients; and selectively updating the IIR filter based on the distance between the plurality of first coefficients and the plurality of second coefficients.

11. The controller of claim 10, wherein the first microphone is disposed on an outer surface of an earpiece, and the second microphone is disposed on an inner surface of the earpiece that is closer than the outer surface to an ear of a user when the earpiece is worn by the user.

12. The controller of claim 10, wherein the second frame of the reference audio signal and the second frame of the error signal follow the first frame of the reference audio signal and the first frame of the error signal, respectively, in time.

13. The controller of claim 10, wherein the determining of the plurality of first coefficients comprises:

converting the first frame of the reference audio signal to an input signal based on the initial IIR filter;

converting the first frame of the error signal to a desired signal based on the initial IIR filter; and determining a first IIR filter for transforming the input signal into the desired signal, the first IIR filter including the plurality of first coefficients.

14. The controller of claim 10, wherein the determining of the plurality of second coefficients comprises:

converting the second frame of the reference audio signal to an input signal based on a first IIR filter having a numerator associated with a predetermined frequency bandwidth and a denominator associated with the plurality of first coefficients;

converting the second frame of the error signal to a desired signal based on the first IIR filter; and determining a second IIR filter for transforming the input signal into the desired signal, the second IIR filter including the plurality of second coefficients.

15. The controller of claim 10, wherein the selective updating of the IIR filter comprises:

determining that the distance between the plurality of first coefficients and the plurality of second coefficients is greater than a threshold distance; and updating the IIR filter responsive to determining that the distance between the plurality of first coefficients and the plurality of second coefficients is greater than the threshold distance.

16. The controller of claim 15, wherein the updating of the IIR filter comprises:

determining a plurality of third coefficients for the IIR filter based on the plurality of second coefficients, a third frame of the reference audio signal, and a third frame of the error signal.

17. The controller of claim 10, wherein the selective updating of the IIR filter comprises:

determining that the distance between the plurality of first coefficients and the plurality of second coefficients is less than a threshold distance; and refraining from updating the IIR filter responsive to determining that the distance between the plurality of first coefficients and the plurality of second coefficients is less than the threshold distance.

18. The controller of claim 17, wherein execution of the instructions further causes the controller to:

output the anti-noise signal via one or more speakers associated with the ANC system based on determining that the distance between the plurality of first coefficients and the plurality of second coefficients is less than the threshold distance.

* * * * *